2,458,505

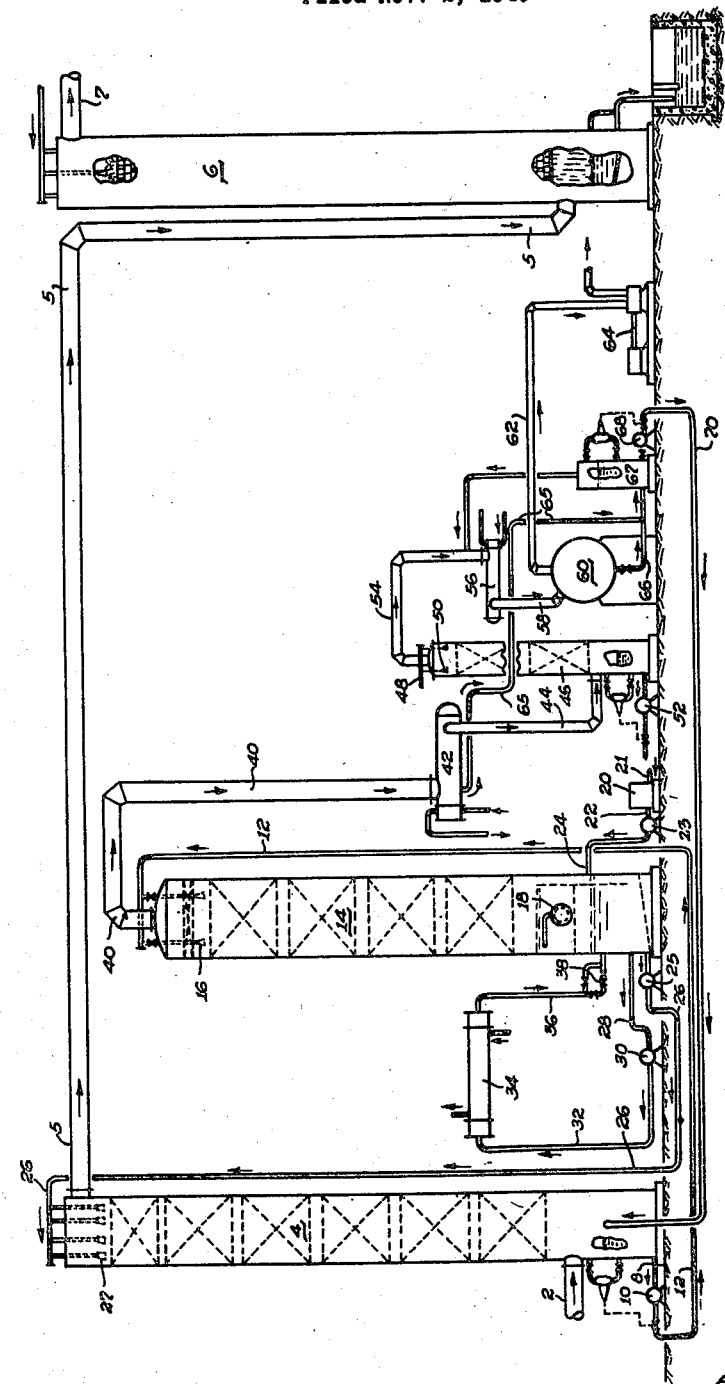
Jan. 11, 1949.  F. DENIG  2,458,505
GAS PURIFICATION PROCESS
Filed Nov. 2, 1945
INVENTOR
FRED DENIG.
BY
his ATTORNEY Patented Jan. 11, 1949

UNITED STATES PATENT OFFICE 2,458,505

GAS PURIFICATION PROCESS

Fred Denig, Pittsburgh, Pa., assignor to Koppers Company, Inc., Pittsburgh, Pa., a corporation of Delaware Application November 2, 1945, Serial No. 626,248

7 Claims. (Cl. 23—151)

The present invention relates to an improved process for the liquid purification of coke-oven gas, coal gases, and the like. The invention has reference to improvements in such process comprising more particularly the separation of naphthalene from the gases emitted from the actifier of a hot-vacuum-actification process which is used for the separation and recovery of hydrogen sulphide, hydrogen cyanide, and carbon dioxide from coke-oven gas.

The said hot-vacuum-actification process has been described and claimed in Sperr et al. 1,533,773 and in subsequent patents for improvements thereof including the recent patent to Gollmar, 2,379,076. Fundamentally, the process comprises the scrubbing of gases containing the named acidic gases with aqueous alkali-metal carbonate solution to absorb the acidic gases, revivification of the absorbent solution by heating it under vacuum to drive off the acidic gases in relatively large volumes of water vapor, recirculation of the reactified absorbent, condensation of the water vapor by indirect cooling, and separation and recovery of the acidic gases.

In the operation of the above described process, small quantities of the napthalene which is present in coke-oven gas become dissolved in the aqueous absorbent, carried into the actifier, and expelled therefrom in the actifier gases. This naphthalene, although present in small quantities, is precipitated from the containing actifier gases at a temperature below its melting point in the condensers that are employed to separate the water vapor from the said acidic gases present therewith. The so-precipitated naphthalene coats condenser tubes, clogs orifices, and otherwise obstructs condenser and separating equipment.

It has been known for a long time that naphthalene is readily soluble in certain hydrocarbon oils, such as wash oil, straw oil, or the like; and naphthalene even though dispersed in large volumes of gas has been successfully removed therefrom by scrubbing with a recirculated and revivified wash oil according to the process of Sperr, 1,578,687. This treatment, however, has contemplated only the removal of naphthalene from relatively dry gas where the problem of moisture condensation and the consequent contamination of the recirculated wash oil has not arisen. The high moisture content of actifier gases and their predominantly acidic nature render so difficult the removal of naphthalene therefrom that the aforesaid naphthalene condensation has remained a vexatious problem in purification operation.

As a further result of the problem of naphthalene deposition, it has been the custom to locate hot-vacuum-actification plants in the gas line of a by-product plant after the final cooler in order to avoid, in this case, the deposition of large quantities of naphthalene in the absorber. The cooling of the gas which is effected in the final cooler is relied upon to remove the major proportion of naphthalene from the gas. When such procedure is followed, a substantial quantity of the hydrogen sulphide and especially the hydrogen cyanide is lost in the final cooler water where the cooling is directly effected, or else special operation of the final cooler has been required, with only partial success, to avoid such loss. This customary expedient of locating the hot-vacuum-actification plant after the final cooler furthermore does not avoid the aforementioned deposition of naphthalene during condensation of the actifier gases.

It has not been found that the aqueous absorbent in the hot-actification plant can be maintained at a sufficiently high temperature that naphthalene will not be precipitated in the absorber even though the absorber be disposed in the gas line before the final cooler, and that efficient absorption of the hydrogen sulphide and hydrogen cyanide can nevertheless be obtained. However, increase in the temperature of the absorbent increases its solubility for naphthalene, and the altered position of the absorber brings the absorbent into contact with much more highly concentrated quantities of naphthalene. Hence greater quantities of naphthalene are carried into the actifier and are liberated into the actifier gases, and the problem of condenser obstruction is thereby intensified to the point of making such an expedient impracticable.

The primary object of the present invention is to provide a process for the removal of naphthalene from liquid purification actifier gases so as to avoid obstruction of gas separation equipment.

It is another object of the invention to provide improvements in process for the separation and recovery of hydrogen sulphide and hydrogen cyanide from coke-oven gas whereby increased yields of these gases can be obtained.

The invention has for further objects such other improvements and such other operative advantages or results as may be found to obtain in the processes or apparatus hereinafter described or claimed.

According to the present invention, hot actifier gases containing a high proportion of water vapor, and hydrogen cyanide, hydrogen sulphide and carbon dioxide, are scrubbed with a recirculated wash oil at such high temperature that substantially no condensation of water vapor occurs and with such large volumes of wash oil relative to the gases being treated that substantially all the naphthalene contained in the said actifier gases is removed therefrom. The invention also comprehends, in combination with the aforementioned naphthalene removal, locating the hot-vacuum-actification plant at a point in the by-product system before the final cooler so that any hydrogen sulphide or hydrogen cyanide which would otherwise be absorbed in the final cooler water will be recovered in the hot-actification plant. This is made practicable only by scrubbing the actifier gases for removal, as hereinbefore described, of its contained naphthalene and it requires that the absorber be operated at a temperature at least as high as the lowest temperature which the coke-oven gas previously has reached in the coke-plant by-product system.

The accompanying drawing, forming a part of this specification and showing a preferred apparatus in which the invention may be embodied and practiced, is a diagrammatic, elevational view of apparatus for the continuous separation and recovery of hydrogen sulphide from coke-oven gas with novel means shown therewith for removal of naphthalene from actifier gases.

Referring now to the drawing, coke-oven gas containing hydrogen sulphide and hydrogen cyanide flows through a pipe 2 into an absorber 4 containing packing and in which the said gas rises in countercurrent contact with continuously descending absorbent, for example, an aqueous solution of sodium carbonate and sodium bicarbonate. The said sodium carbonate solution in the absorber 4 absorbs hydrogen sulphide, hydrogen cyanide, and carbon dioxide from the countercurrently flowing coke-oven gas. The so-treated coke-oven gas leaves the absorber at the top thereof through a pipe 5 and flows to the base of a final cooler 6 wherein the gas rises in countercurrent contact with downflowing cooling water. The so-cooled and purified coke-oven gas flows from the said final cooler 6 to additional apparatus of the by-product system through the pipe 7. Fouled absorbent solution flows from a reservoir at the bottom of the absorber 4 through a valved pipe 8 and is pumped by a pump 10 through a pipe 12 into the top of a packed actifier column 14. The absorbent solution from the pipe 12 is sprayed into the top of the actifier column 14 through distributing nozzles 16 and flows down over packing in the column. In the actifier 14 the fouled absorbent is brought into direct contact with rising countercurrently flowing gases and vapors which continuously liberate dissolved hydrogen sulphide and hydrogen cyanide from the fouled absorbent, and which thereby actify the downflowing absorbent. The actifier 14 is provided with a reboiler 18 that is supplied with steam for vaporization, by indirect contact, of downflowing solution.

Fresh absorbent solution is prepared in a mixing tank 20 to which is delivered steam or water and sodium carbonate through a pipe 21. The fresh absorbent is pumped from the mixing tank through a pipe 22 by a pump 23 and through a pipe 24 into a reservoir in the bottom of the actifier 14 where it is added to actified absorbent solution.

Actified absorbent solution is pumped from storage in the base of the actifier 14 by a pump 25 through a pipe 26 and into the top of the absorber 4 wherein the solution is distributed over packing by spray nozzles 27.

Actified absorbent solution may also be withdrawn from the actifier 14 through a pipe 28 and pumped by a pump 30 through a pipe 32 to heat exchanger means 34 wherein the absorbent solution is heated by indirect contact with hot fluid effluent from the coke-oven plant as is described and claimed in U. S. Patent to Gollmar, 2,379,076, and in copending applications Serial No. 578,861 and Serial No 578,862 filed August 2, 1945. The hot fluid can be coke-oven gas, flushing liquor, or quenching liquor. The heated absorbent flows from the heat exchanger means 34 through a pipe 36 in return to the actifier 14 and is released through a back pressure valve 38 into the actifier which is under reduced pressure. Upon release into the reduced pressure zone the heated absorbent forms vapors which flow countercurrently in direct contact with downflowing absorbent solution and serve to actify the solution and liberate the absorbed hydrogen cyanide and hydrogen sulphide. Naphthalene is also liberated from the solution in the fouled absorbent by the described actification. When the actified solution is heated by hot fluid effluent from the coke ovens, it may or may not be necessary to use the reboiler 18.

The acidic gases, napthalene, and steam in admixture therewith are flowed from the top of the actifier 14 through a pipe 40 into a condenser 42 in which a major portion of the water vapors is condensed at a temperature above the dew point of the napthalene in the gases. This disposition of a water-vapor condenser in the actifier-gas line before the napthalene removal means is a preferred method of operation for it permits the subsequent napthalene removal means to be operated at a lower temperature and without the contamination of napthalene wash oil with water.

The actifier gases are flowed through a pipe 44 and into a scrubber 46 wherein they are brought into direct contact with countercurrently downflowing wash oil. It is important that the wash oil be maintained at a temperature as high as the temperature of the actifier gases entering the scrubber in order to prevent condensation of water vapor therein. The wash oil, which is introduced into the scrubber 46 through a pipe 48 having distributing nozzles 50, flows down over packing in the scrubber, and absorbs napthalene from the actifier gases in direct contact therewith. Enriched wash oil is withdrawn from a reservoir therefor in the base of the scrubber 46 by a pump 52 and is directed thereby to distillation means for recovery of the napthalene and revivification of the wash oil. It is preferable to recirculate the wash oil continuously, as herein described, but a stationary volume of wash oil through which the actifier gases pass can be employed, and only after the wash oil has developed an appreciable vapor pressure of napthalene need it be drawn off and fresh oil be substituted.

Actifier gases from which napthalene and any anthracene therewith have been removed, flow from the scrubber 46 through a pipe 54 into a condenser 56 wherein a further portion of the water vapor of the said gases is condensed. Thence the cooled acidic gases are flowed from the condenser 56 through a pipe 58 into a tank 60 for collection of condensate. Relatively dry hydogen sulphide and hydrogen cyanide are continuously withdrawn from the said tank 60 through a pipe 62 by a vacuum pump 64 by which means the entire actification zone is held under less than atmospheric pressure and by which means also the acidic gases are pumped through a pipe 62 to any point for utilization thereof. The hydrogen sulphide and hydrogen cyanide can be separated by any of several known processes whereby substantially pure hydrogen sulphide and hydrogen cyanide can be obtained.

Aqueous condensate containing dissolved acidic gases are flowed from the vapor condensers 42 and 56 and the tank 60 through pipes 65 and 66 into a pumping tank 67. The condensate is pumped therefrom by a pump 68 through a pipe 70 into the reservoir of fouled absorbent solution at the base of the absorber 4.

The following is an example of the treatment of coke-oven gas by the present invention:

A coke-oven gas containing 260 grains per 100 cubic feet of hydrogen sulphide, 56 grains per 100 cubic feet of hydrogen cyanide at a temperature of 130° F. was held under a gauge pressure of 18 inches of water and was passed through an absorbent approximately 90 feet high with a diameter of 19 feet, 6 inches. The gas passed upwardly through the tower in contact with an aqueous absorbent solution containing sodium carbonate which was circulated downwardly through the tower at the rate of 2500 gallons per hour. The gas was saturated with naphthalene at a temperature of 113° F. which is the lowest temperature to which the gas has previously been cooled in the by-product system. At the operating temperature of 130° F., the solubility of naphthalene is about .093 pound per 1000 pounds of water. The 208,000 pounds of absorbent solution which are circulated through the tower per hour absorbs about 8.3 pounds of naphthalene per hour.

The fouled solution containing the absorbed hydrogen sulphide and hydrogen cyanide and naphthalene is pumped at the rate of 2500 gallons per hour through the actifier tower, the solution entering the top of the tower at approximately 122.5° F. and leaving the base of the tower at 127° F. Heat is supplied to the base of the tower indirectly from steam delivered at the reboiler and also by the recirculation of actified solution from the base of the actifier column into indirect contact with flushing liquor from the coke plant. The actified solution is recirculated to the heat exchanger at the rate of 150,000 gallons per hour and is heated in the exchanger to 152° F. before returning to the base of the actifier, the flushing liquor being supplied to the heat exchanger at a temperature of 174° F. and returned from the heat exchanger at 161° F. A vacuum is maintained on the actifier with an absolute pressure of 4.2 inches Hg at the base and 3.7 inches Hg at the top. Actifier gases pass out of the top of the actifier at the temperature of approximately 122.5° F. The actifier gases are composed of water vapor, hydrogen sulphide, hydrogen cyanide, carbon dioxide and all of the naphthalene that has been absorbed.

The actifier gases flow at the following rates per constituent:

| | Pounds per hour |
|---|---|
| $H_2O$ vapor | 27,000 |
| $H_2S$ | 642 |
| HCN | 137.3 |
| $CO_2$ | 170.7 |

The actifier gases are introduced into a vapor condenser wherein they are brought into indirect contact with water at about 80° F. Herein a large portion of the water vapor is condensed thereby reducing the content of the actifier gases in respect of water vapor to 625 pounds per hour. The reduced temperature of the actifier gases leaving the vapor condenser is approximately 100° F. at which temperature the gases are about 30 per cent saturated with naphthalene.

The actifier gases are thereafter flowed into a naphthalene scrubbing tower wherein they are washed with a wash oil flowing in countercurrent contact therewith at a rate of 400 gallons per hour. The wash oil absorbs approximately all of the naphthalene in the actifier gases and after such enrichment is pumped to the benzol plant of the by-product system wherein the naphthalene is removed from the wash oil by distillation. The wash oil is continuously returned to the naphthalene scrubber at the said rate, losses thereof being made up by additions of fresh wash oil. The gases effluent of the naphthalene scrubber are thereafter flowed through a second vapor condenser and are cooled by indirect contact with water to a temperature of approximately 100° F., 2580 gallons per hour of aqueous condensate being separated therefrom. The so-treated gases, comprising 161 pounds per hour of water vapor and 950 pounds per hour of fixed gases, enter a vacuum pump at an absolute pressure of 3 inches Hg and a temperature of 75° F. They are pumped from the vacuum pump under a gauge pressure of 5 pounds per square inch and are again cooled providing additional condensation of water therefrom. The so-treated gases are delivered to apparatus for separation of hydrogen sulphide and hydrogen cyanide therefrom at the following rate and with the following composition:

| | Pounds per hour |
|---|---|
| $H_2O$ vapor | 12 |
| $H_2S$ | 642 |
| HCN | 137.3 |
| $CO_2$ | 170.7 |

On the basis of a usual naphthalene content in the gases leaving the naphthalene scrubber of not more than 2 to 4 grains per 100 cubic feet, all reasonable possibility of deposition of naphthalene in the apparatus subsequent to the naphthalene scrubber is removed.

Although the foregoing description refers specifically to naphthalene as the compound in major proportion for the removal of which the process of invention is primarily concerned, the invention also comprehends within its scope the removal of similar readily condensable compounds such, for example, as anthracene.

The invention as hereinabove set forth is embodied in particular form and manner but may be variously embodied within the scope of the claims hereinafter made.

I claim:

1. An improved process for the liquid purification of gas containing acidic gases and naphthalene, comprising: scrubbing the gas with an alkaline aqueous solution at a temperature sufficiently high to avoid condensation of naphthalene while absorbing therein acidic gases and a minor amount of naphthalene; in a separate actification zone, heating the fouled solution under vacuum to strip therefrom in a stream of water vapor, the acidic gases, and naphthalene; washing the vapors stripped from the solution with an absorbent oil to remove naphthalene therefrom, the said absorbent oil being maintained at a temperature at least as high as the temperature of the vapors entering the said washing step; cooling the vapors to condense water vapor therefrom; and separating and recovering constituents of the so-treated acidic gases.

2. In a hot-vacuum-actification process for the separation and recovery of hydrogen sulphide and hydrogen cyanide from coke-oven gas wherein the coke-oven gas is scrubbed with an aqueous alkali-metal carbonate solution and the solution containing the absorbed gases is thereafter heated under vacuum to strip the hydrogen sulphide and hydrogen cyanide therefrom in a stream of water vapor, the improvement comprising: scrubbing the vaporized gases stripped from the absorption solution with a wash oil at a temperature above the dew point of the water vapor contained therein to remove naphthalene therefrom.

3. In a hot-vacuum-actification process for the separation and recovery of hydrogen sulphide and hydrogen cyanide from cooled coke-oven gas which has not been cooled so much as to condense out all the naphthalene, the improvements comprising: scrubbing the cooled coke-oven gas with an aqueous alkali-metal carbonate solution at a temperature sufficiently high to avoid condensation of naphthalene and thereby absorbing into the solution hydrogen sulphide, hydrogen cyanide, and naphthalene; thereafter in a separate actification zone heating the fouled solution under vacuum to vaporize water and the contained acidic gases and naphthalene from the solution; washing the vapors stripped from the solution with a wash oil at a temperature sufficiently high to prevent condensation of the water vapor in the gases entering the washing zone while absorbing naphthalene; recovering naphthalene from the wash oil; condensing water vapor from the unabsorbed vapors; and thereafter separating and recovering hydrogen cyanide and hydrogen sulphide from the uncondensed gases.

4. In a hot-vacuum-actification process for the recovery of hydrogen sulphide and hydrogen cyanide from cooled coke-oven gas which has not been cooled so much as to condense out all the naphthalene, the improvements comprising: absorbing hydrogen cyanide, hydrogen sulphide and naphthalene from the cooled coke-oven gas by scrubbing the same with an aqueous alkali-metal carbonate solution at a temperature at least as high as the lowest temperature to which the coke-oven gas has previously been cooled; and washing the actifier gases from the actification zone under a vacuum with wash oil at a temperature higher than the dew point of the water vapor in the actifier gases to remove therefrom naphthalene which has become dissolved in the alkali-metal carbonate solution during the absorption step and has been liberated into the actifier gases during the actification of the absorbent.

5. A process for the liquid purification of cooled coke-oven gas which has not been cooled so much as to condense out all the naphthalene and for the separation and recovery of improved yields of hydrogen sulphide and hydrogen cyanide therefrom, comprising: continuously scrubbing the cooled coke-oven gas with an aqueous alkali-metal carbonate solution at a temperature at least as high as the lowest temperature to which the coke-oven gas had previously been cooled to absorb hydrogen sulphide, hydrogen cyanide, and a minor amount of naphthalene from the gas; continuously flowing solution containing the absorbed constitutents into an actification zone of reduced pressure and therein heating the solution continuously to vaporize as actifier gases therefrom hydrogen sulphide, hydrogen cyanide and naphthalene; continuously washing the actifier gases with a hydrocarbon wash oil at a temperature at least higher than the dew point of the water vapor at the pressure in the actifier gases to absorb therefrom naphthalene; removing so-enriched wash oil from the washing step and revivifying it by distilling naphthalene therefrom; continuously recycling revivified wash oil to the said washing step; condensing water vapor from the actifier gases; and separating hydrogen sulphide and hydrogen cyanide from the so-treated actifier gases.

6. A process as claimed in claim 1 wherein the water in the vapors that have been stripped from the fouled solution is partially condensed before the removal of naphthalene by cooling the vapors to a temperature above the dew point of the naphthalene therein.

7. A process as claimed in claim 1 wherein the heat required for actifying the fouled aqueous solution and liberating hydrogen sulphide and hydrogen cyanide is supplied by heat interchange from coke-plant waste fluids of low thermal head.

FRED DENIG.

REFERENCES CITED

The following references are of record in the file of this patent:

UNITED STATES PATENTS

| Number | Name | Date |
|---|---|---|
| 1,578,687 | Sperr | Mar. 30, 1926 |
| 1,944,903 | Powell | Jan. 30, 1934 |
| 2,386,359 | Schreiber | Oct. 9, 1945 |

Certificate of Correction

Patent No. 2,458,505. January 11, 1949.

FRED DENIG

It is hereby certified that error appears in the printed specification of the above numbered patent requiring correction as follows:

Column 2, line 23, for "has not been" read *has now been*;

and that the said Letters Patent should be read with this correction therein that the same may conform to the record of the case in the Patent Office.

Signed and sealed this 7th day of June, A. D. 1949.

[SEAL]

THOMAS F. MURPHY,
*Assistant Commissioner of Patents.*